US009919561B2

(12) United States Patent
Tomoi

(10) Patent No.: US 9,919,561 B2
(45) Date of Patent: Mar. 20, 2018

(54) ADHESIVE COMPOSITION AND PNEUMATIC TIRE USING SAME

(71) Applicant: The Yokohama Rubber Co., Ltd., Tokyo (JP)

(72) Inventor: Shusaku Tomoi, Hiratsuka (JP)

(73) Assignee: THE YOKOHAMA RUBBER CO., LTD., Tokyo (JP)

(*) Notice: Subject to any disclaimer, the term of this patent is extended or adjusted under 35 U.S.C. 154(b) by 811 days.

(21) Appl. No.: 14/322,286

(22) Filed: Jul. 2, 2014

(65) Prior Publication Data

US 2014/0311644 A1 Oct. 23, 2014

Related U.S. Application Data

(62) Division of application No. 13/259,062, filed as application No. PCT/JP2011/055853 on Mar. 7, 2011, now Pat. No. 9,643,452.

(30) Foreign Application Priority Data

May 31, 2010 (JP) ................................. 2010-124508
Sep. 10, 2010 (JP) ................................. 2010-203131

(51) Int. Cl.
*B60C 5/14* (2006.01)
*B60C 1/00* (2006.01)
(Continued)

(52) U.S. Cl.
CPC .............. *B60C 5/14* (2013.01); *B60C 1/0008* (2013.01); *C09J 111/00* (2013.01); *C09J 153/02* (2013.01);
(Continued)

(58) Field of Classification Search
CPC ............................ B60C 5/14; B60C 2005/145
See application file for complete search history.

(56) References Cited

U.S. PATENT DOCUMENTS 4,131,709 A   12/1978   Schunck et al.
4,148,963 A    4/1979   Bourrain et al.
(Continued)

FOREIGN PATENT DOCUMENTS

JP   53-019353 A   2/1978
JP   54-091543 A   7/1979
(Continued)

OTHER PUBLICATIONS

XP002727995—English language Abstract of JP2004-143219.
(Continued)

*Primary Examiner* — Liam J Heincer
(74) *Attorney, Agent, or Firm* — Polsinelli PC

(57) ABSTRACT

Provided is an adhesive composition that provides excellent adhesion between a thermoplastic resin or a thermoplastic elastomer in which an elastomer component is dispersed in the thermoplastic resin and a tire by a combination of general-purpose materials, without using any special polymer. The adhesive composition comprises 100 parts by weight of a base polymer and 20 to 50 parts by weight of a resol-type phenolic resin-based resin crosslinking agent, wherein 100 parts by weight of the base polymer comprises 80 to 99 parts by weight of a thermoplastic elastomer and 1 to 20 parts by weight of a halogenated rubber. The resol-type phenolic resin-based resin crosslinking agent is preferably an alkylphenol-formaldehyde resin. Examples of the thermoplastic elastomer can include styrene-butadiene-styrene block copolymers, and examples of the halogenated rubber can include chloroprene rubber and chlorosulfonated polyethylene.

9 Claims, 1 Drawing Sheet

(51) Int. Cl.
  *C09J 111/00* (2006.01)
  *C09J 153/02* (2006.01)
  *C08L 15/02* (2006.01)
  *C08L 61/06* (2006.01)
  *C08L 61/14* (2006.01)

(52) U.S. Cl.
  CPC ......... *B60C 2005/145* (2013.01); *C08L 15/02* (2013.01); *C08L 61/06* (2013.01); *C08L 61/14* (2013.01); *Y10T 428/265* (2015.01); *Y10T 428/2874* (2015.01)

(56) References Cited

U.S. PATENT DOCUMENTS

| | | | |
|---|---|---|---|
| 4,497,926 A | 2/1985 | Toy | |
| 5,040,583 A * | 8/1991 | Lin | B60C 1/0016 152/510 |
| 5,755,899 A * | 5/1998 | Hecker | B60C 1/0008 152/510 |
| 5,938,869 A * | 8/1999 | Kaido | B29D 30/0681 152/510 |
| 2005/0197442 A1* | 9/2005 | Jones | C08L 23/22 524/474 |
| 2006/0182976 A1* | 8/2006 | Yamakawa | B32B 25/02 428/421 |
| 2008/0251174 A1* | 10/2008 | Romani | B60C 1/0016 152/209.1 |
| 2008/0280715 A1 | 11/2008 | Monden et al. | |
| 2009/0114328 A1* | 5/2009 | Takahashi | B29C 66/712 152/510 |
| 2009/0114329 A1* | 5/2009 | Tomoi | B29C 33/68 152/510 |
| 2009/0288749 A1* | 11/2009 | Tomoi | B32B 25/14 152/510 |
| 2009/0308517 A1 | 12/2009 | Nohara et al. | |
| 2009/0311548 A1* | 12/2009 | Kirino | B32B 25/08 428/517 |
| 2010/0024941 A1* | 2/2010 | Hara | B32B 25/08 152/510 |
| 2010/0071823 A1* | 3/2010 | Tomoi | B29D 30/0681 152/510 |
| 2010/0076144 A1* | 3/2010 | Moore | C08L 23/16 524/502 |
| 2010/0147432 A1* | 6/2010 | Morooka | B32B 25/08 152/511 |
| 2010/0193098 A1* | 8/2010 | Kirino | C08L 15/00 152/450 |
| 2011/0011511 A1* | 1/2011 | Miyazaki | B60C 1/0008 152/564 |
| 2012/0103487 A1* | 5/2012 | Majumdar | B60C 1/0008 152/209.5 |
| 2012/0118468 A1* | 5/2012 | Hahn | B60C 1/0008 152/564 |
| 2013/0078477 A1* | 3/2013 | Shibata | B32B 25/08 428/475.5 |
| 2013/0199687 A1* | 8/2013 | Sugimoto | B60C 1/0008 152/510 |
| 2014/0087110 A1* | 3/2014 | Ogasawara | B60C 1/0008 428/36.8 |
| 2014/0261976 A1* | 9/2014 | Imoto | B60C 1/0008 156/134 |
| 2015/0191046 A1* | 7/2015 | Shibata | C08L 21/00 428/492 |
| 2015/0252155 A1* | 9/2015 | Sato | B29B 7/60 525/57 |
| 2016/0263868 A1* | 9/2016 | Tomoi | B60C 1/0008 |

FOREIGN PATENT DOCUMENTS

| | | |
|---|---|---|
| JP | 60-261706 A | 12/1985 |
| JP | 62-096576 A | 5/1987 |
| JP | H02-135272 A | 5/1990 |
| JP | 5-239428 A | 9/1993 |
| JP | 5-311577 A | 11/1993 |
| JP | 6-306340 A | 11/1994 |
| JP | H06-306640 A | 11/1994 |
| JP | H07-053931 A | 2/1995 |
| JP | 2004-143219 A | 5/2004 |
| JP | 2005068173 A | 3/2005 |
| JP | 2006-214046 A | 8/2006 |
| JP | 2007-100003 A | 4/2007 |
| JP | 2008-285541 A | 11/2008 |
| JP | 2009-220793 A | 10/2009 |
| WO | WO-2006/062103 A1 | 6/2006 |

OTHER PUBLICATIONS

XP002727996—English language Abstract of WO2006/062103.
XP002727997—English language Abstract of JPH06306340.
Extended European Search Report issued in counterpart European Application No. 11778784 dated Aug. 12, 2014.
Non-Final Office Action dated Sep. 2, 2014 in counterpart JP Appln No. 2010-203131.

\* cited by examiner

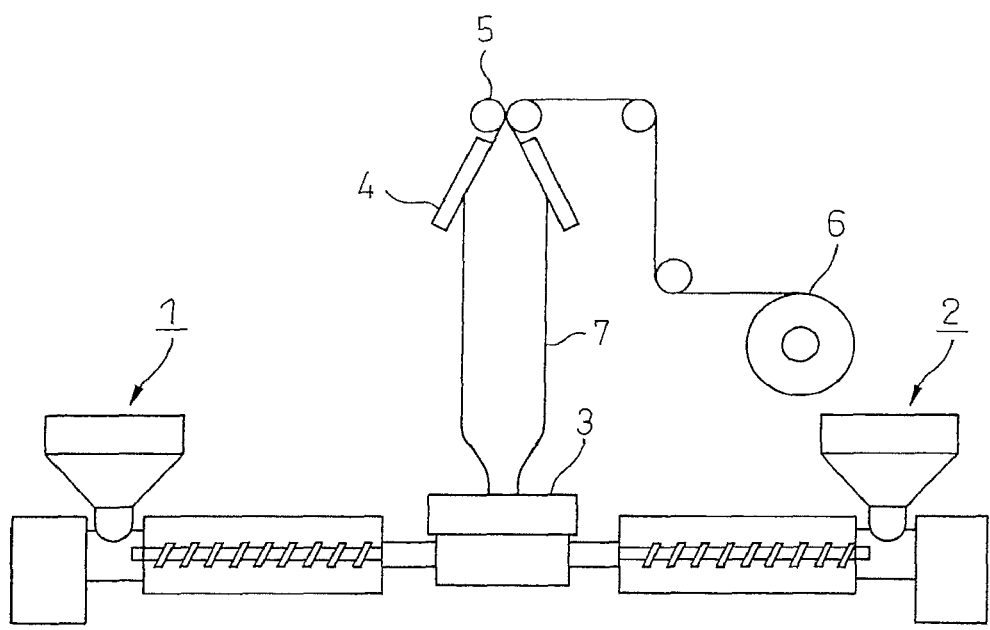

ADHESIVE COMPOSITION AND PNEUMATIC TIRE USING SAME

CROSS-REFERENCE TO RELATED APPLICATIONS

This application is a Divisional of co-pending application Ser. No. 13/259,062, filed on Sep. 22, 2011, which is a National Phase filing under 35 U.S.C. § 371 of PCT/JP2011/055853, filed on Mar. 7, 2011; and this application claims priority to Application No. 2010-124508, filed in Japan on May 31, 2010 and Application No. 2010-203131, filed in Japan on Sep. 10, 2010 under 35 U.S.C. § 119; the entire contents of all are hereby incorporated by reference.

TECHNICAL FIELD

The present invention relates to an adhesive composition and a pneumatic tire using the same. More specifically, the invention relates to an adhesive composition for adhering an air permeation preventive layer made of a thermoplastic resin or a thermoplastic elastomer to the inner surface of a pneumatic tire, and also relates to a laminate including a layer made of the adhesive composition and to a pneumatic tire using the laminate.

BACKGROUND ART

There is known an adhesive composition including an epoxy-modified styrene-butadiene-styrene block copolymer, a tackifier resin and an organic peroxide crosslinking agent, as an adhesive composition for adhering a thermoplastic resin or a thermoplastic elastomer to the inner surface of a pneumatic tire in which the thermoplastic resin or the thermoplastic elastomer is used as the air permeation preventive layer of the tire (JP 2005-68173 A).

In addition, as an adhesive composition for bonding a resin film layer to a rubber-like elastic layer, there is known an adhesive composition including a halogenated rubber, a filler, a crosslinking agent, a resin or a low molecular weight polymer, and an organic solvent (JP 2007-100003 A).

SUMMARY OF INVENTION

Technical Problem

It is an object of the present invention to provide an adhesive composition that allows excellent adhesion between a thermoplastic resin or a thermoplastic elastomer and a tire by a combination of general-purpose materials, without using a special polymer, namely, any epoxy-modified styrene-butadiene-styrene block copolymer.

Solution to Problem

The first invention of the present invention is an adhesive composition comprising 100 parts by weight of a base polymer and 20 to 50 parts by weight of a resol-type phenolic resin-based resin crosslinking agent, wherein 100 parts by weight of the base polymer comprises 80 to 99 parts by weight of a thermoplastic elastomer and 1 to 20 parts by weight of a halogenated rubber.

The thermoplastic elastomer is preferably at least one selected from the group consisting of styrene-butadiene-styrene block copolymers (SBS), styrene-isoprene-styrene block copolymers (SIS), styrene-butadiene-butylene-styrene block copolymers (SBBS) and styrene-ethylene-butylene-styrene block copolymers (SEBS).

The melt flow rate of the thermoplastic elastomer is preferably 10 g/10 minutes or more, as measured at 200° C. under a load of 5 kg in accordance with JIS K 7210.

The halogenated rubber is preferably at least one selected from the group consisting of chloroprene rubber, chlorosulfonated polyethylene, chlorinated polyethylene, chlorinated butyl rubber, brominated butyl rubber and brominated poly (isobutylene-co-p-methylstyrene).

One hundred (100) parts by weight of the base polymer preferably comprises 5 to 10 parts by weight of the halogenated rubber.

The resol-type phenolic resin-based resin crosslinking agent is preferably an alkylphenol-formaldehyde resin or a modified product thereof.

The adhesive composition preferably comprises 30 to 40 parts by weight of the resol-type phenolic resin-based resin crosslinking agent, based on 100 parts by weight of the base polymer.

Preferably, the adhesive composition has, in an uncrosslinked state, a capillary shear melt viscosity of 2000 Pa·s or lower at a temperature of 150° C. and a shear rate of 243 s$^{-1}$ and has a torque of 0.5 dN·m or lower after 20 minutes at 150° C. and a torque of 1.0 dN·m or higher after 20 minutes at 175° C. as measured by a rotorless rheometer.

The second invention of the present invention is a laminate comprising a layer made of the adhesive composition and a layer made of a thermoplastic resin or a layer made of a thermoplastic elastomer composition having a continuous phase of a thermoplastic resin component and a dispersed phase of an elastomer component.

The layer made of the adhesive composition has a thickness of preferably 5 to 100 μm.

The third invention of the present invention is a pneumatic tire comprising the laminate as an air permeation preventive layer.

Advantageous Effects of Invention

The adhesive composition of the present invention has both adhesiveness and fluidity by the combination of a thermoplastic elastomer, a halogenated rubber and a resol-type phenolic resin-based resin crosslinking agent, without using the specific polymer, namely, any epoxy-modified styrene-butadiene-styrene block copolymer. Therefore, the adhesive composition allows film extrusion molding such as inflation molding, as well as allows excellent adhesion between the thermoplastic resin or the thermoplastic elastomer and a tire.

BRIEF DESCRIPTION OF DRAWINGS

FIG. 1 is a view showing an example of an inflation molding apparatus that can be used to produce a laminate according to the present invention.

DESCRIPTION OF EMBODIMENTS

An adhesive composition according to the present invention includes a base polymer and a resol-type phenolic resin-based resin crosslinking agent. The base polymer includes a thermoplastic elastomer and a halogenated rubber.

The thermoplastic elastomer constituting the base polymer includes, but is not limited to, styrene-based thermoplastic elastomers, olefin-based thermoplastic elastomers, vinyl chloride-based thermoplastic elastomers, 1,2-polybutadiene (RB), urethane-based thermoplastic elastomers, ester-based thermoplastic elastomers, amide-based thermoplastic elastomers, trans-1,4-polyisoprene and fluorine-based thermoplastic elastomers. Among them, preferred are styrene-based thermoplastic elastomers, from the viewpoint of fluidity in melting and reactivity with the resin crosslinking agent.

Examples of the styrene-based thermoplastic elastomers include styrene-butadiene-styrene block copolymers (SBS), styrene-isoprene-styrene block copolymers (SIS), styrene-butadiene-butylene-styrene block copolymers (SBBS), styrene-ethylene-butylene-styrene block copolymers (SEBS), styrene-isoprene-butadiene-styrene block copolymers (SIBS), styrene-ethylene-propylene block copolymers (SEP) and styrene-ethylene-propylene-styrene block copolymers (SEPS). Among them, preferred are styrene-butadiene-styrene block copolymers (SBS) and styrene-isoprene-styrene block copolymers (SIS), and particularly preferred are styrene-butadiene-styrene block copolymers (SBS). The thermoplastic elastomer to be used can be a commercially available product.

The thermoplastic elastomer constituting the base polymer has a melt flow rate (hereinafter referred to also as "MFR") of preferably 10 g/10 minutes or more and more preferably 13 to 20 g/10 minutes as measured at 200° C. under a load of 5 kg in accordance with JIS K 7210. If the melt flow rate is too low, the viscosity of the adhesive composition becomes excessively high, so that extrudability may be deteriorated. Conversely, if it is too high, the viscosity thereof becomes excessively low, thus possibly deteriorating extrudability.

The halogenated rubber includes, but is not limited to, chloroprene rubber, chlorosulfonated polyethylene, chlorinated polyethylene, chlorinated butyl rubber, brominated butyl rubber, brominated poly(isobutylene-co-p-methylstyrene), chlorinated ethylene-propylene copolymers, chlorinated ethylene-propylene-nonconjugated diene terpolymers, polyvinyl chloride, chlorine-containing acrylic rubber and epichlorohydrin rubber. Among them, preferred are chloroprene rubber, chlorosulfonated polyethylene, chlorinated polyethylene, chlorinated butyl rubber, brominated butyl rubber and brominated poly(isobutylene-co-p-methylstyrene). Particularly preferred are chloroprene rubber and chlorosulfonated polyethylene. The halogenated rubber to be used can be a commercially available product.

The halogenated rubber seems to activate the resin crosslinking agent to accelerate reaction of the resin crosslinking agent with rubber as a material to be adhered and reaction of the resin crosslinking agent with, as a material to be adhered, a thermoplastic resin or a thermoplastic elastomer composition having a continuous phase of a thermoplastic resin component and a dispersed phase of an elastomer component.

In the mixing ratio between the thermoplastic elastomer and the halogenated rubber constituting the base polymer, based on 100 parts by weight of the base polymer, the amount of the thermoplastic elastomer is 80 to 99 parts by weight and the amount of the halogenated rubber is 1 to 20 parts by weight. Preferably, based on 100 parts by weight of the base polymer, the amount of the thermoplastic elastomer is 90 to 95 parts by weight and the amount of the halogenated rubber is 5 to 10 parts by weight. If the amount of the halogenated rubber is too high, the reaction of the resin crosslinking agent is excessively accelerated and thereby scorching may occur in the adhesive composition in the process of mixing and extrusion. Conversely, if it is too low, the acceleration of reaction of the resin crosslinking agent becomes insufficient, which may lead to reduction in adhesive force.

The resin crosslinking agent to be used in the present invention is a resol-type phenolic resin. Examples of the resol-type phenolic resin include alkylphenol formaldehyde resins, phenol formaldehyde co-condensed resins, cresol formaldehyde co-condensed resins, resorcinol phenol formaldehyde co-condensed resins and resorcinol cresol formaldehyde co-condensed resins, or modified products thereof. Among them, preferred are alkylphenol formaldehyde resins or modified products thereof. Herein, the modified products of alkylphenol formaldehyde resins refer to halogenated products and sulfur chloride condensation products of alkylphenol formaldehyde resins. The resol-type phenolic resin to be used can be a commercially available product.

When sulfur or a sulfur-based vulcanization accelerator is added to the adhesive composition, the sulfur or the sulfur-based vulcanization accelerator inhibits adhesiveness. Thus, it is preferred to not add sulfur or a sulfur-based vulcanization accelerator to the adhesive composition. The present invention uses a resol-type phenolic resin-based resin crosslinking agent, without using sulfur or a sulfur-based vulcanization accelerator. By adding the resol-type phenolic resin-based resin crosslinking agent, the present invention can have both adhesiveness and fluidity, thereby allowing film extrusion molding such as inflation molding and also allowing excellent adhesion between a thermoplastic resin or a thermoplastic elastomer and a tire. Furthermore, the addition of the resol-type phenolic resin-based resin crosslinking agent makes it unnecessary to use any epoxy-modified styrene-butadiene-styrene block copolymer that is a special polymer.

In the mixing ratio between the base polymer and the resol-type phenolic resin-based resin crosslinking agent constituting the adhesive composition, the amount of the resol-type phenolic resin-based resin crosslinking agent is 20 to 50 parts by weight and preferably 30 to 40 parts by weight, based on 100 parts by weight of the base polymer. If the amount of the resol-type phenolic resin-based resin crosslinking agent is too high, there may be a problem of scorching in the process of mixing and extrusion of the adhesive composition and there may be deterioration in physical properties, such as increased modulus of elasticity and reduced extension of the adhesive composition due to the increased resin component. Conversely, if it is too low, the fluidity of the adhesive composition may be reduced and the adhesiveness thereof may be deteriorated.

The adhesive composition of the present invention has, in an uncrosslinked state, a capillary shear melt viscosity of preferably 2000 Pa·s or lower and more preferably 500 to 1500 Pa·s or lower at the temperature of 150° C. and the shear race of 243 $s^{-1}$. Excessively high capillary shear melt viscosity may deteriorate extrudability in inflation molding or the like, whereas excessively low capillary shear melt viscosity may also deteriorate extrudability.

The adhesive composition of the present invention has a torque of preferably 0.5 dN·m or lower and more preferably 0.1 to 0.4 dN·m after 20 minutes at 150° C. as measured by a rotorless rheometer. If the torque after 20 minutes at 150° C. is too large, it indicates that crosslinking reaction occurs near a molding temperature, so that a problem may occur in extrusion molding. Conversely, if the torque is too small, extrudability may be deteriorated as in the case of the capillary shear melt viscosity.

Additionally, the adhesive composition of the present invention has a torque of preferably 1.0 dN·m or higher and more preferably 1.0 to 4.0 dN·m after 20 minutes at 175° C. as measured by the rotorless rheometer. If the torque after 20 minutes at 175° C. is too low, it indicates that no crosslinking reaction occurs near a vulcanization temperature, so that the adhesiveness of the adhesive may not occur. Conversely, if it is too high, it indicates the presence of excessive crosslinking reactions, which may thus suggest deterioration in physical properties of the adhesive.

Preferably, the adhesive composition of the present invention further includes zinc oxide. The addition of zinc oxide can improve the breaking strength of the adhesive composition under high temperature. In general, in the production of a pneumatic tire in which an air permeation preventive layer made of a thermoplastic resin or a thermoplastic elastomer is adhered to the inner surface of the pneumatic tire via an adhesive composition layer, a bladder is used in a vulcanization step. However, when contracting and removing the bladder under high temperature immediately after vulcanization, the air permeation preventive layer can remain adhered to the bladder to be separated. This occurs when the adhesive composition layer has a small breaking strength under high temperature. Adding a large amount of zinc oxide to the adhesive composition allows the maintaining of the breaking strength under high temperature immediately after vulcanization. Therefore, the above problem can be solved.

To the adhesive component of the present invention, in addition to the above-described essential components, there can be added various kinds of additives that are generally added to conventional adhesive compositions, such as a reinforcement agent (filler), a plasticizer, an aging prevention agent, a coloring agent and an inner release agent. The additives can be added in conventional amounts, without departing from the scope of the present invention.

A laminate according to a second invention of the present invention is a laminate including a layer made of the adhesive composition and a layer made of a thermoplastic resin or a layer made of a thermoplastic elastomer composition having the continuous phase of a thermoplastic resin component and the dispersed phase of an elastomer component. The laminate can be suitably used as the air permeation preventive layer of a pneumatic tire.

Examples of the thermoplastic resin constituting the thermoplastic resin layer include polyamide resins (such as nylon 6 (N6), nylon 66 (N66), nylon 11 (N11), nylon 12 (N12), nylon 610 (N610) and nylon 612 (N612)), polyester-based resins (such as polybutylene terephthalate (PBT) polyethylene terephthalate (PET) and polyethylene isophthalate (PEI)), polynitrile-based resins (such as polyacrylonitrile (PAN) and polymethacrylonitrile), polymethacrylate-based resins (such as poly(methyl methacrylate) (PMMA) and poly(ethyl methacrylate)), polyvinyl-based resins (such as vinyl acetate, polyvinyl alcohol (PVA), ethylene-vinyl alcohol copolymers (EVOH), polyvinylidene chloride (PVDC) and polyvinyl chloride (PVC)), cellulose-based resins (such as cellulose acetate and cellulose acetate butyrate), fluorine-based resins (such as polyvinylidene fluoride (PVDF) and polyvinyl fluoride (PVF)) and imide-based resins (such as aromatic polyimide (PI)). Among them, preferred are polyamide resins and ethylene-vinyl alcohol copolymers when using the laminate as the air permeation preventive layer of a pneumatic tire.

The thermoplastic elastomer composition constituting the thermoplastic elastomer composition layer has the continuous phase of a thermoplastic resin component and the dispersed phase of an elastomer component.

Examples of the thermoplastic resin component constituting the continuous phase of the thermoplastic elastomer composition may be the same as those of the thermoplastic resin constituting the thermoplastic resin layer.

Examples of the elastomer component constituting the dispersed phase of the thermoplastic elastomer composition include diene-based rubbers and hydrogenated products thereof (such as natural rubbers (NR), isoprene rubbers (IR), styrene-butadiene rubbers (SBR), butadiene rubbers (BR) and acrylonitrile butadiene rubbers (NBR)), olefin-based rubbers (such as ethylene propylene rubbers (EPDM and EPM) and butyl rubbers (IIR)), acryl rubbers (ACM), halogen-containing rubbers (such as Br-IIR, Cl-IIR, brominated poly(isobutylene-co-p-methylstyrene) (Br-IPMS)), silicone rubbers (such as methyl vinyl silicone rubbers and dimethyl silicone rubbers), sulfur-containing rubbers (such as polysulfide rubbers), fluoro rubbers (such as vinylidene fluoride-based rubbers and fluoro-containing vinyl ether rubbers) and thermoplastic elastomers (such as styrene-based elastomers, olefin-based elastomers, acid-modified olefin-based elastomers, ester-based elastomers, urethane-based elastomers and polyamide-based elastomers). Among them, preferred are brominated poly(isobutylene-co-p-methylstyrene), olefin-based elastomers and acid-modified olefin-based elastomers when using the laminate as the air permeation preventive layer of a pneumatic tire.

The thermoplastic elastomer composition can be produced by melt-blending the thermoplastic resin component and the elastomer component, for example, in a twin-screw compounding and extrusion apparatus or the like to disperse the elastomer component as the dispersed phase in the thermoplastic resin forming the continuous phase (a matrix phase).

The weight ratio between the thermoplastic resin component and the elastomer component is, but not limited to, preferably 10/90 to 90/10 and more preferably 15/85 to 90/10.

The layer made of the thermoplastic resin and the layer made of the thermoplastic elastomer can include various kinds of additives within a range not deteriorating the advantages of the present invention.

The layer made of the adhesive composition has a thickness of preferably 5 to 100 μm, and more preferably 10 to 70 μm. If it is not sufficiently thick, desired adhesion cannot be obtained, whereas, if it is too thick, the weight increases and thereby the durability may be poor.

The layer made of the thermoplastic resin or the thermoplastic elastomer composition has a thickness of preferably 1 to 200 μm, and more preferably 5 to 150 μm. If the thickness thereof is too small, barrier properties of the layer can be reduced in the use as the air permeation preventive layer. Conversely, if it is too large, the weight of the layer increases and thereby the durability can be poor.

The method for producing the laminate of the present invention is not limited to the following, but the laminate can be produced by co-extrusion of the adhesive composition and the thermoplastic resin or the thermoplastic elastomer composition. For example, the laminate can be produced using an inflation molding apparatus shown in FIG. 1. In FIG. 1, the thermoplastic resin or the thermoplastic elastomer composition is fed into extruder 1 and the adhesive composition is fed into extruder 2. Through a die 3, they are extruded as a tube-shaped film 7 having two layers, of which the layer made of the adhesive composition is on the outside. Then, through guide plates 4, the tube-shaped film 7 is folded by pinch rolls 5 to be wound up by a winding machine 6.

A pneumatic tire according to a third invention of the present invention is a pneumatic tire using the laminate as an air permeation preventive layer.

The pneumatic tire of the present invention can be produced by a usual method. For example, the laminate produced by the above method is placed on a tire molding drum such that the layer made of the thermoplastic resin or the layer made of the thermoplastic elastomer composition is on the side facing a tire molding drum. Thereon are sequentially attached material members used for usual tire production, such as a carcass layer, a belt layer and a tread layer made of unvulcanized rubber. After molding, the drum is taken out to obtain a green tire. Next, the green tire is vulcanized according to the normal method, allowing the production of a desired pneumatic tire.

Examples (1) Preparation of Adhesive Composition

Ingredients shown in Tables 2 and 3 were dry-blended and fed into a twin screw kneader (manufactured by The Japan Steel Works, Ltd.) to be kneaded at 130° C. for 3 minutes. The kneaded product was extruded in a strand shape and cooled down with water, followed by application of an adhesion preventing agent to be formed into pellets by a resin pelletizer. In this manner, adhesive compositions of Examples 1 to 10 and Comparative Examples 1 to 7 were prepared.

Raw materials used to prepare the adhesive compositions are as follows.

SBS (1): A styrene-butadiene-styrene block copolymer "TUFPRENE® A" (MFR=13 g/10 minutes), manufactured by Asahi Kasei Chemicals Corporation.

SBS (2): A styrene-butadiene-styrene block copolymer "TUFPRENE® 126S" (MFR=20 g/10 minutes), manufactured by Asahi Kasei Chemicals Corporation.

Chloroprene rubber: "DENKA CHLOROPRENE® S41" manufactured by Denki Kagaku Kogyou Kabushiki Kaisya.

Chlorosulfonated polyethylene: "HYPALON® 45" manufactured by Dupont Elastomer Co., Ltd.

Zinc oxide: Three kinds of zinc oxide manufactured by Seido Chemical Industry Co., Ltd.

Tackifier resin: "ESCOLETS 1315" manufactured by Toneks Co., Ltd.

Resin crosslinking agent (1): A resol-type alkylphenol formaldehyde resin "HITANOL® 2501" manufactured by Hitachi Chemical Co., Ltd.

Resin crosslinking agent (2): A novolac-type phenolic resin "SUMICANOL 620" manufactured by Taoka Chemical Co., Ltd.

Sulfur: Oil treatment sulfur manufactured by Hosoi Chemical Industry Co., Ltd.

Sulfur-based vulcanization accelerator: A thiuram-based vulcanization accelerator "NOKUSERA TOT-N" (tetrakis (2-ethylhexyl)thiuram disulfide) manufactured by Ouchi Shinko Chemical Industrial Co., Ltd.

(2) Preparation of Thermoplastic Elastomer Composition

The thermoplastic elastomer compositions used in Examples were formulated as shown in Table 1 and prepared as follows.

The rubber and the crosslinking agent were mixed by a closed type Banbury mixer (manufactured by Kobe Steel, Ltd.) at 100° C. for 2 minutes to produce a rubber compound, which was then processed into pellets by a rubber pelletizer (manufactured by Moriyama Manufacturing Co., Ltd.). Meanwhile, the resin and the plasticizer were kneaded at 250° C. for 3 minutes by the twin screw kneader (manufactured by The Japan Steel Works, Ltd) to be formed into pellets. The obtained pellets made of the resin composition, the pellets made of the above-mentioned rubber compound and modified polyolefin were kneaded at 250° C. for 3 minutes by the twin screw kneader (manufactured by The Japan Steel Works, Ltd) to obtain pellets made of a thermoplastic elastomer composition.

Raw materials used to prepare the thermoplastic elastomer composition are as follows.

Br-IPMS: A brominated poly(isobutylene-co-p-methylstyrene) rubber "EXXPRO® MDX 89-4" manufactured by ExxonMobil Chemical Company.

Zinc oxide: Three kinds of zinc oxide manufactured by Seido Chemical Industry Co., Ltd.

Stearic acid: Beads stearate manufactured by NOF Corporation.

Zinc stearate: Zinc stearate manufactured by Sakai Chemical Industry Co., Ltd.

Nylon 6/66: "UBE NYLON" 5033B manufactured by UBE Industries, Ltd.

BBSA: N-butylbenzensulfonamide "BM-4" manufactured by Daihachi Chemical Industry Co., Ltd.

Mah-EEA: Modified EEA "HPR AR201" manufactured by Dupont-Mitsui Polychemicals Co., Ltd.

TABLE 1

Formulation of Thermoplastic Elastomer Composition

| | | Parts by weight |
|---|---|---|
| Rubber | Br-IPMS | 100 |
| Crosslinking agent | Zinc oxide | 0.15 |
| | Stearic acid | 0.60 |
| | Zinc stearate | 0.30 |
| Resin | Nylon 6/66 | 63 |
| Plasticizer | BBSA | 27 |
| Modified polyolefin | Mah-EEA | 10 |
| Total | | 201.05 |

(3) Production of Laminate

The adhesive composition prepared in the above (1) and the thermoplastic elastomer composition prepared in the above (2) were extruded by an inflation molding apparatus shown in FIG. 1, in a tube shape of two layers, of which the layer made of the adhesive composition was on the outside. The extrudate was blow-molded into a shape with a diameter of 390 mm and folded by pinch rolls to be wound up as it was. The compositions were extruded such that the tube had an adhesive composition layer of 30 μm in thickness and a thermoplastic elastomer composition layer of 100 μm in thickness.

(4) Production of Tire

The two-layered laminate produced in the above (3) was placed on a tire molding drum in such a manner that the thermoplastic elastomer composition layer was the inside layer. Thereon were sequentially attached members used for usual tire production, such as a carcass layer, a belt layer and a tread layer made of unvulcanized rubber, and then the drum was taken out to obtain a green tire. Next, the green tire was heated for vulcanization according to a usual method to produce a tire having a size of 195/65R15.

(5) Evaluation of Adhesive Compositions

The adhesive compositions prepared in the above (1) were evaluated in terms of capillary shear viscosity, rheometer torque, extrusion moldability and adhesiveness in tire. Tables 2 and 3 show evaluation results. The method for evaluating each evaluation item is as follows.

[Capillary Shear Viscosity]

Melt viscosity (unit: Pa·s) was measured using an orifice having a diameter of 1 mm and a length of 10 mm, at a shear rate of 243 $s^{-1}$ and a temperature of 150° C. for a retention time of 5 minutes by a capillary rheometer "CAPILLO-GRAPH 1C" manufactured by Toyo Seiki Seisaku-sho, Ltd.

[Rheometer Torque]

A torque after 20 minutes at 150° C. and a torque after 20 minutes at 170° C. were measured using a rotorless rheometer "CURELASTOMETER V" manufactured by Orientech K.K.

[Extrusion Moldability]

Laminates were produced by the method described in the above (3) to be evaluated based on the following criteria.

Excellent: There is no problem with extrudability.

Fair: Extrusion is possible, but resin pressure is high and thus some scorched particles or the like occur.

Failure: Extrusion is impossible due to excessive resin pressure and the occurrence of many scorched particles.

[Adhesiveness in Tire]

Tires were produced by the method described in the above (4) to make cuts having a width of 5 mm and a depth of 0.5 mm (6 points on the circumference) at an angle of 45 degrees with respect to the circumferential direction in a location at a distance of 10 mm to the bead side from a belt end portion inside the produced tires. The tires were subjected to a 5000 km-running test conducted at an internal air pressure of 140 kPa, using a drum with a diameter of 1707 mm, at 80 km/hour and a load of 5.5 kN. After the test, the inner surface of the tires was observed to check the separation of the air permeation preventive layer based on the following determination criteria.

Good: Separation from a crack proceeded less than 1 mm and was not interfacial separation.

Fair: Separation from a crack proceeded 1 mm or more and less than 5 mm but was not interfacial separation.

Poor: Separation from a crack proceeded 5 mm or more and adhesive's interfacial separation was found.

TABLE 2

Formulations of Adhesive Composition and Evaluation Results

| Raw materials | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| SBS(1) | wt part | | 95 | | | | | | | | |
| SBS(2) | wt part | 95 | | 95 | 95 | 95 | 95 | 80 | 90 | 99 | 95 |
| Chloroprene rubber | wt part | 5 | 5 | | 5 | 5 | 5 | 20 | 10 | 1 | 5 |
| Chlorosulfonated polyethylene | wt part | | | 5 | | | | | | | |
| Zinc oxide | wt part | 5 | 5 | 5 | 5 | 5 | 5 | 5 | 5 | 5 | 100 |
| Tackifier resin | wt part | 20 | 20 | 20 | 40 | 30 | 10 | 20 | 20 | 20 | 20 |
| Resin crosslinking agent (1) | wt part | 40 | 40 | 40 | 20 | 30 | 50 | 40 | 40 | 40 | 40 |
| Resin crosslinking agent (2) | wt part | | | | | | | | | | |
| Sulfur | wt part | | | | | | | | | | |
| Sulfur-based vulcanization accelerator | wt part | | | | | | | | | | |
| Total | wt part | 165 | 165 | 165 | 165 | 165 | 165 | 165 | 165 | 165 | 260 |
| Capillary shear melt viscosity | Pa · s | 1100 | 2000 | 1000 | 1070 | 1050 | 1300 | 1550 | 1200 | 990 | 1250 |
| Rheometer torque (150° C., 20 min.) | dN · m | 0.25 | 0.5 | 0.3 | 0.3 | 0.3 | 0.4 | 0.5 | 0.4 | 0.2 | 0.3 |
| Rheometer torque (175° C., 20 min.) | dN · m | 2.5 | 4.0 | 2.5 | 2.0 | 2.5 | 3.2 | 3.8 | 3.4 | 1.0 | 3.5 |
| Extrusion moldability | | Excellent | Fair | Excellent | Excellent | Excellent | Fair | Fair | Excellent | Excellent | Excellent |
| Adhesiveness evaluation in tire | | Good | Good | Good | Fair | Good | Good | Good | Good | Fair | Good |

TABLE 3

Formulations of Adhesive Composition and Evaluation Results (Continued)

| materials | | Comp Ex. 1 | Comp Ex. 2 | Comp Ex. 3 | Comp Ex. 4 | Comp Ex. 5 | Comp Ex. 6 | Comp Ex. 7 |
|---|---|---|---|---|---|---|---|---|
| SBS(1) | wt part | | | | | | | |
| SBS(2) | wt part | 95 | 95 | 95 | 75 | 100 | 95 | 95 |
| Chloroprene rubber | wt part | 5 | 5 | 5 | 25 | | 5 | 5 |
| Chlorosulfonated polyethylene | wt part | | | | | | | |
| Zinc oxide | wt part | 5 | 5 | 5 | 5 | 5 | 5 | 5 |
| Tackifier resin | wt part | 50 | | 20 | 20 | 20 | 60 | 60 |
| Resin crosslinking agent (1) | wt part | 10 | 60 | | 40 | 40 | | |
| Resin crosslinking agent (2) | wt part | | | 40 | | | | |

TABLE 3-continued

Formulations of Adhesive Composition and Evaluation Results (Continued)

| materials | | Comp Ex. 1 | Comp Ex. 2 | Comp Ex. 3 | Comp Ex. 4 | Comp Ex. 5 | Comp Ex. 6 | Comp Ex. 7 |
|---|---|---|---|---|---|---|---|---|
| Sulfur | wt part | | | | | | 2 | |
| Sulfur-based vulcanization accelerator | wt part | | | | | | 1 | 2 |
| Total | wt part | 165 | 165 | 165 | 165 | 165 | 168 | 167 |
| Capillary shear melt viscosity | Pa·s | 710 | 1350 | 1100 | 1600 | 1000 | 1050 | 1100 |
| Rheometer torque (150° C., 20 min.) | dN·m | 0.2 | 0.55 | 0.25 | 0.6 | 0.3 | 0.25 | 0.25 |
| Rheometer torque (175° C., 20 min.) | dN·m | 0.9 | 3.9 | 0.2 | 4.0 | 0.2 | 0.2 | 0.2 |
| Extrusion moldability | | Excellent | Failure | Excellent | Failure | Excellent | Excellent | Excellent |
| Adhesiveness evaluation in tire | | Poor | Not evaluated | Poor | Not evaluated | Poor | Poor | Poor |

INDUSTRIAL APPLICABILITY

The adhesive composition of the present invention can be used for production of pneumatic tires. More specifically, the adhesive composition thereof can be used as an air permeation preventive layer of tires by laminating the composition and a thermoplastic resin or a thermoplastic elastomer composition having the continuous phase of a thermoplastic resin component and the dispersed phase of an elastomer component.

REFERENCE SIGNS LIST 1 extruder
2 extruder
3 die
4 guide plate
5 pinch roll
6 winding machine
7 tube-shaped film

The invention claimed is:

1. A pneumatic tire comprising as an air permeation preventive layer, a laminate comprising a layer made of an adhesive composition comprising 100 parts by weight of a base polymer and 20 to 50 parts by weight of a resol-type phenolic resin-based resin crosslinking agent, wherein 100 parts by weight of the base polymer comprises 80 to 99 parts by weight of a thermoplastic elastomer and 1 to 20 parts by weight of a halogenated rubber and a layer made of a thermoplastic resin or a layer made of a thermoplastic elastomer composition having a continuous phase of a thermoplastic resin component and a dispersed phase of an elastomer component.

2. The pneumatic tire according to claim 1, wherein the thermoplastic elastomer in the adhesive composition is at least one member selected from the group consisting of styrene-butadiene-styrene block copolymers (SBS), styrene-isoprene-styrene block copolymers (SIS), styrene-butadiene-butylene-styrene block copolymers (SBBS) and styrene-ethylene-butylene-styrene block copolymers (SEBS).

3. The pneumatic tire according to claim 1, wherein the melt flow rate of the thermoplastic elastomer in the adhesive composition is 10 g/10 minutes or more, as measured at 200° C. under a load of 5 kg in accordance with JIS K 7210.

4. The pneumatic tire according to claim 1, wherein the halogenated rubber is at least one member selected from the group consisting of chloroprene rubber, chlorosulfonated polyethylene, chlorinated polyethylene, chlorinated butyl rubber, brominated butyl rubber and brominated poly(isobutylene-co-p-methylstyrene).

5. The pneumatic tire according to claim 1, wherein 100 parts by weight of the base polymer comprises 5 to 10 parts by weight of the halogenated rubber.

6. The pneumatic tire according to claim 1, wherein the resol-type phenolic resin-based resin crosslinking agent is an alkylphenol-formaldehyde resin or a modified product thereof.

7. The pneumatic tire according to claim 1, wherein the adhesive composition comprises 30 to 40 parts by weight of the resol-type phenolic resin-based resin crosslinking agent, based on 100 parts by weight of the base polymer.

8. The pneumatic tire according to claim 1, wherein the adhesive composition has, in an uncrosslinked state, a capillary shear melt viscosity of 2000 Pa·s or lower at a temperature of 150° C. and a shear rate of 243 $s^{-1}$ and has a torque of 0.5 dN·m or lower after 20 minutes at 150° C. and a torque of 1.0 dN·m or higher after 20 minutes at 175° C. as measured by a rotorless rheometer.

9. The pneumatic tire according to claim 1, wherein the layer made of the adhesive composition has a thickness of 5 to 100 μm.

* * * * *